(12) United States Patent
Nagesh et al.

(10) Patent No.: US 9,697,266 B1
(45) Date of Patent: Jul. 4, 2017

(54) MANAGEMENT OF COMPUTING SYSTEM ELEMENT MIGRATION

(71) Applicant: EMC Corporation, Hopkinton, MA (US)

(72) Inventors: Karthik Nagesh, Bangalore (IN); Ullas B. Nambiar, Bangalore (IN); Prateek Sharma, Bangalore (IN); Thirumale Niranjan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 218 days.

(21) Appl. No.: 14/039,926

(22) Filed: Sep. 27, 2013

(51) Int. Cl.
 *G06F 7/00* (2006.01)
 *G06F 17/00* (2006.01)
 *G06F 17/30* (2006.01)

(52) U.S. Cl.
 CPC .. *G06F 17/30575* (2013.01); *G06F 17/30067* (2013.01)

(58) Field of Classification Search
 USPC ........................................................ 707/634
 See application file for complete search history.

(56) References Cited

U.S. PATENT DOCUMENTS

| | | | | |
|---|---|---|---|---|
| 6,151,608 | A * | 11/2000 | Abrams | G06F 17/303 |
| | | | | 707/679 |
| 6,405,364 | B1 * | 6/2002 | Bowman-Amuah | G06Q 10/06 |
| | | | | 717/101 |
| 6,571,258 | B1 * | 5/2003 | Borowsky et al. | |
| 8,209,511 | B2 * | 6/2012 | Tomita et al. | 711/165 |
| 8,296,329 | B1 * | 10/2012 | Das | 707/802 |
| 2003/0192028 | A1 * | 10/2003 | Gusler | G06Q 10/10 |
| | | | | 717/101 |
| 2005/0055357 | A1 * | 3/2005 | Campbell | G06F 8/64 |
| 2007/0088630 | A1 * | 4/2007 | MacLeod | G06Q 10/087 |
| | | | | 705/28 |
| 2007/0245110 | A1 * | 10/2007 | Shibayama et al. | 711/165 |
| 2008/0201542 | A1 * | 8/2008 | Maruyama | G06F 3/0607 |
| | | | | 711/165 |
| 2009/0113380 | A1 * | 4/2009 | Ploesser | G06F 8/20 |
| | | | | 717/104 |
| 2010/0049917 | A1 * | 2/2010 | Kono et al. | 711/114 |
| 2010/0228764 | A1 * | 9/2010 | Sallakonda | G06F 17/3051 |
| | | | | 707/769 |
| 2012/0089797 | A1 * | 4/2012 | Shibayama | G06F 11/3419 |
| | | | | 711/162 |

* cited by examiner

*Primary Examiner* — Kris Mackes
*Assistant Examiner* — Lin Lin Htay
(74) *Attorney, Agent, or Firm* — Ryan, Mason & Lewis, LLP

(57) ABSTRACT

A first data set is obtained specifying configuration information associated with elements of a computing system. A second data set is also obtained specifying dependency information associated with the elements of the computing system. A third data set is also obtained specifying deployment constraint information associated with the elements of the computing system. A plan for migrating one or more of the elements of the computing system is automatically generated based on at least a portion of the first data set, at least a portion of the second data set, and at least a portion of the third data set. The automatic generation of the migration plan checks for one or more conflicts between configuration information, dependency information and deployment constraint information and generates the migration plan to at least substantially eliminate the one or more conflicts.

19 Claims, 6 Drawing Sheets

*FIG. 4A* 410

| SERVER INFORMATION ||||| 
|---|---|---|---|---|
| SERVER NAME | ENVIRONMENT | MIGRATION METHOD | OS | TYPE OF SERVER |
| S1 | PRODUCTION | DECOMMISSION | WINDOWS | DATABASE |
| S2 | PRODUCTION | FORK LIFT | LINUX | |
| S3 | TEST | P2V | LINUX | |
| S4 | TEST | V2V | LINUX | DATABASE |
| S5 | PRODUCTION | P2V | LINUX | |
| R1 | PRODUCTION | P2V | LINUX | |
| T1 | TEST | P2V | LINUX | |
| T2 | DEVELOPMENT | P2V | WINDOWS | |

*FIG. 4B* 420

| APPLICATION-SERVER MAPPING |||
|---|---|---|
| APPLICATION NAME | SERVER NAME | SERVER ENVIRONMENT |
| APP1 | S1 | PROD |
| APP1 | S2 | PROD |
| APP1 | S3 | TEST |
| APP2 | S4 | TEST |
| APP2 | S5 | PROD |
| APP4 | R1 | PROD |
| APP5 | T1 | TEST |
| APP6 | T2 | DEV |

*FIG. 4C* 430

| SERVER-SERVER MAPPING ||
|---|---|
| SOURCE | TARGET |
| S1 | R1, S2 |
| S2 | S1 |
| S3 | R1 |
| S4 | R1 |
| S5 | T1, T2 |

| LINK PROPERTIES ||
|---|---|
| LINK TYPE | LINK STRENGTH |
| DATABASE-SERVER | 8 |
| PRIMARY SERVER-PRIMARY SERVER | 5 |
| PRIMARY SERVER-SECONDARY SERVER | 3 |
| SECONDARY SERVER-SECONDARY SERVER | 1 |

| CONSTRAINTS TABLE | | | | | |
|---|---|---|---|---|---|
| SERVER NAME | MIGRATION TIMING | | | MOVES WITH | MUST NOT MOVE WITH |
| | WEEKDAY | WEEKEND | BUSINESS HOURS | | |
| S1 | Y | N | Y | | |
| S2 | Y | N | N | W2 | S5 |
| S3 | N | N | Y | | |
| S4 | Y | Y | Y | | |
| S5 | N | Y | N | | |
| R1 | Y | Y | Y | | |
| T1 | N | Y | Y | | |
| T2 | Y | N | N | | |
| TEST SERVERS MOVE BEFORE DEV AND PROD SERVERS OF SAME APPLICATION. ||||||
| SERVERS BELONGING TO SAME APPLICATION BUT OF DIFFERENT ENVIRONMENTS CANNOT MOVE TOGETHER. ||||||

| JOINT MIGRATION PLAN | | | | | | |
|---|---|---|---|---|---|---|
| PLAN | WEEK 1- TUESDAY (BIZ HOURS) | WEEK 1- SATURDAY | WEEK 2- MONDAY | WEEK 2- TUESDAY (BIZ HOURS) | WEEK 3- SATURDAY | WEEK 4- THURSDAY |
| PLAN 1 | S3 | | S1, S2, S4, R1, T2 | | S5, T1 | |
| PLAN 2 | S3, R1 | | S1, S2, S4, T2 | | S5, T1 | |
| PLAN 3 | S3 | | S1, S2, S4, R1 | | S5, T1 | T2 |

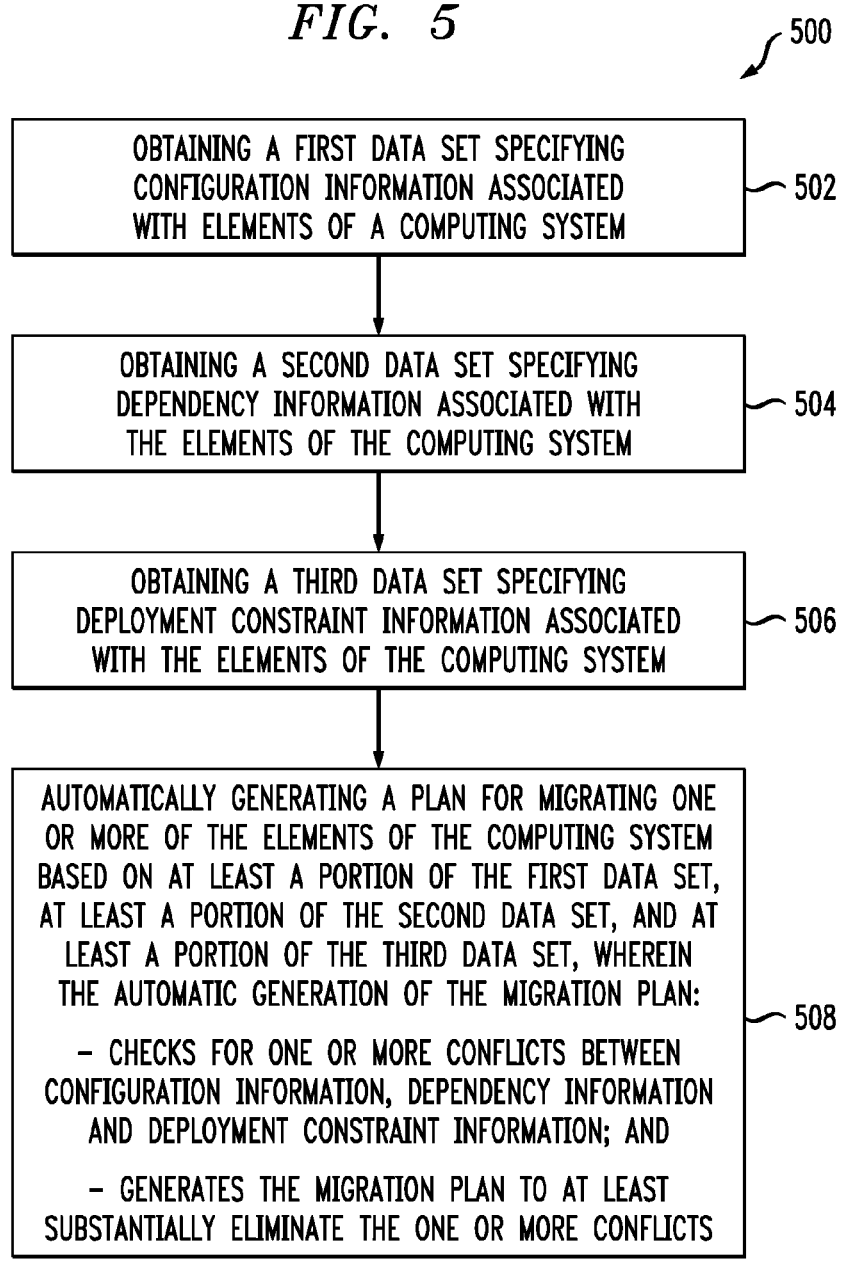

MANAGEMENT OF COMPUTING SYSTEM ELEMENT MIGRATION

FIELD

The field relates to computing systems, and more particularly to techniques for jointly managing computing system element bundling and deployment planning associated with migration.

BACKGROUND

Large enterprises depend heavily on their information technology (IT) systems and applications to run their businesses. For each one of these enterprises, IT systems and applications are typically distributed across multiple geographic locations. Since IT costs are a significant component of an enterprise's overall operational costs, large enterprises need to become more efficient and still cut costs. To achieve this goal, enterprises periodically undertake large transformation projects where all or parts of the IT infrastructure are simplified by consolidating the infrastructure, for example, into a smaller number of data center locations. Such consolidation typically includes migrating one or more elements of the infrastructure. Migration can refer to physical migration, virtual migration, combinations thereof, and can be performed within a datacenter, across geographic locations, and combinations thereof, depending upon the given requirements.

A common practice for managing migration is to employ spreadsheets and a very large number of consultants to manually create plans and schedules which attempt to take into account issues associated with the migration. However, it is known that this manual practice is typically inefficient and requires a full redesign when any changes occur, which is typical in most migrations. This increases the turnaround time for generating plans which in turn extends the period of migration causing inconvenience to users of the IT systems and applications.

SUMMARY

Embodiments of the invention provide techniques for managing computing system element bundling and deployment planning associated with migration.

In one embodiment, a method comprises the following steps. A first data set is obtained specifying configuration information associated with elements of a computing system. A second data set is also obtained specifying dependency information associated with the elements of the computing system. A third data set is also obtained specifying deployment constraint information associated with the elements of the computing system. A plan for migrating one or more of the elements of the computing system is automatically generated based on at least a portion of the first data set, at least a portion of the second data set, and at least a portion of the third data set. The automatic generation of the migration plan checks for one or more conflicts between configuration information, dependency information and deployment constraint information and generates the migration plan to at least substantially eliminate the one or more conflicts.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor operatively coupled to the memory and configured to perform steps of the above-described method.

Advantageously, illustrative embodiments described herein provide techniques that jointly optimize server bundling constraints and deployment constraints associated with one or more migration operations in a distributed computing system.

These and other features and advantages of the present invention will become more readily apparent from the accompanying drawings and the following detailed description.

BRIEF DESCRIPTION OF THE DRAWINGS

FIGS. 4A through 4F show a server migration planning and scheduling example which considers bundling and deployment constraints, in accordance with one embodiment of the invention.

FIG. 5 shows a migration management methodology, in accordance with one embodiment of the invention.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system," "distributed computing system" and "data storage system" as used herein are intended to be broadly construed, so as to encompass, for example, private or public cloud computing and/or storage systems, as well as other types of systems comprising distributed virtual and/or physical infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. As used herein, the term "enterprise" refers to a business, company, firm, venture, organization, operation, concern, corporation, establishment, partnership, a group of one or more persons, or some combination thereof.

Figure 1:
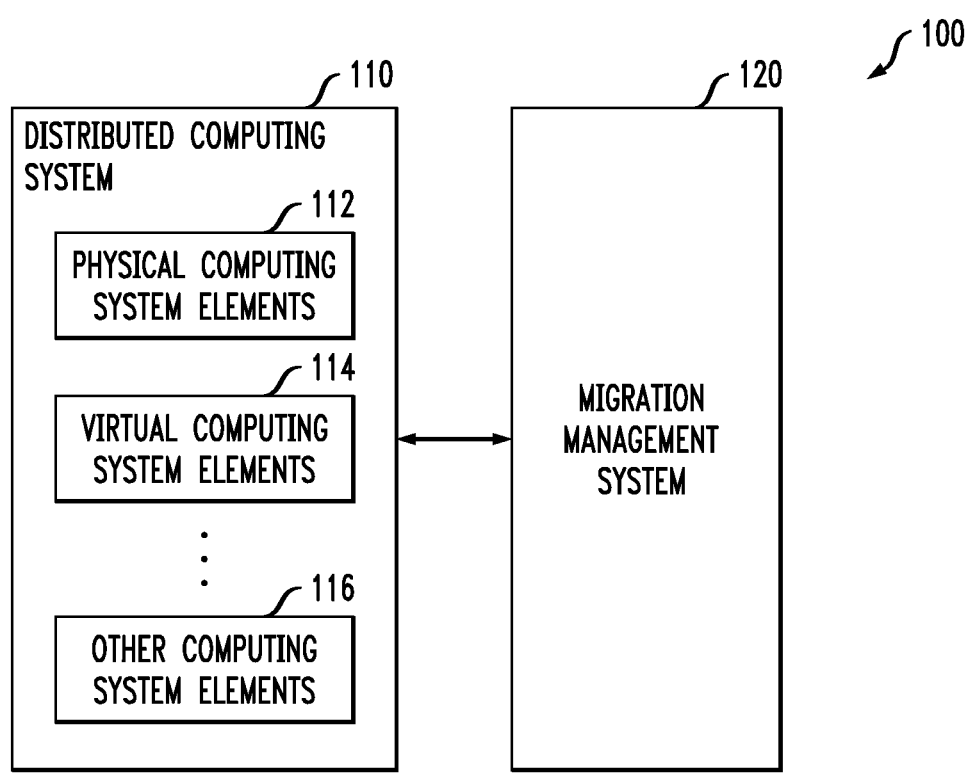
FIG. 1 shows a migration management system environment, in accordance with one embodiment of the invention.

FIG. 1 shows a migration management system environment, in accordance with one embodiment of the invention.

As shown in system environment 100, a migration management system 120 is operatively coupled to a distributed computing system 110.

The distributed computing system 110 comprises various computing system elements, e.g., physical computing system elements 112, virtual computing system elements 114, as well as other computing system elements 116. Examples of physical computing system elements include, but are not limited to, host processing devices, storage arrays, etc. Examples of virtual computing system elements include, but are not limited to, virtual machines (VMs), logical storage units (LUNs), etc. Other computing system elements include, but are not limited to, computing system elements that are not characterized as physical or virtual, as well as applications and other software programs that are part of the distributed computing system 110. It is assumed that a migration can be a physical migration, a virtual migration, a software migration, a data migration, and combinations thereof. A migration can be performed within a datacenter, across geographic locations, and combinations thereof, depending upon the given requirements. It is to be appreciated that illustrative embodiments described herein refer to server migration. As used herein, the term "server" is intended to refer to, without limitation, one or more physical computing system elements, one or more virtual computing system elements, and/or one or more other computing system elements.

As such, in one or more embodiments, the migration management system 120 generates joint plans for server migration and deployment in the context of the distributed computing system 110. For example, techniques implemented by the migration management system 120 ensure maximum adherence to bundling constraints such as environment, customer-specified, timing constraints, joint movement, etc. and deployment constraints such as downtime limits, resource availability (logistics), etc. to generate efficient migration plans. Such techniques are robust to changes in customer constraints or deployment delays as they can easily incorporate the new constraints and quickly re-generate updated plans. It is to be understood that the term "bundling" as used herein refers to grouping computing system elements for purposes of migration. The term "deployment" as used herein refers to actual provisioning for use of the computing system elements that are migrated.

Although the components 110 and 120 are shown as separate in FIG. 1, these components or portions thereof may be implemented at least in part on a common processing platform. In other embodiments, components 110 and 120 may each be implemented on a separate processing platform. It is also to be understood that a given embodiment may include multiple instances of the components 110 and 120, although only single instances of such components are shown in the system diagram for clarity and simplicity of illustration.

Figure 2:
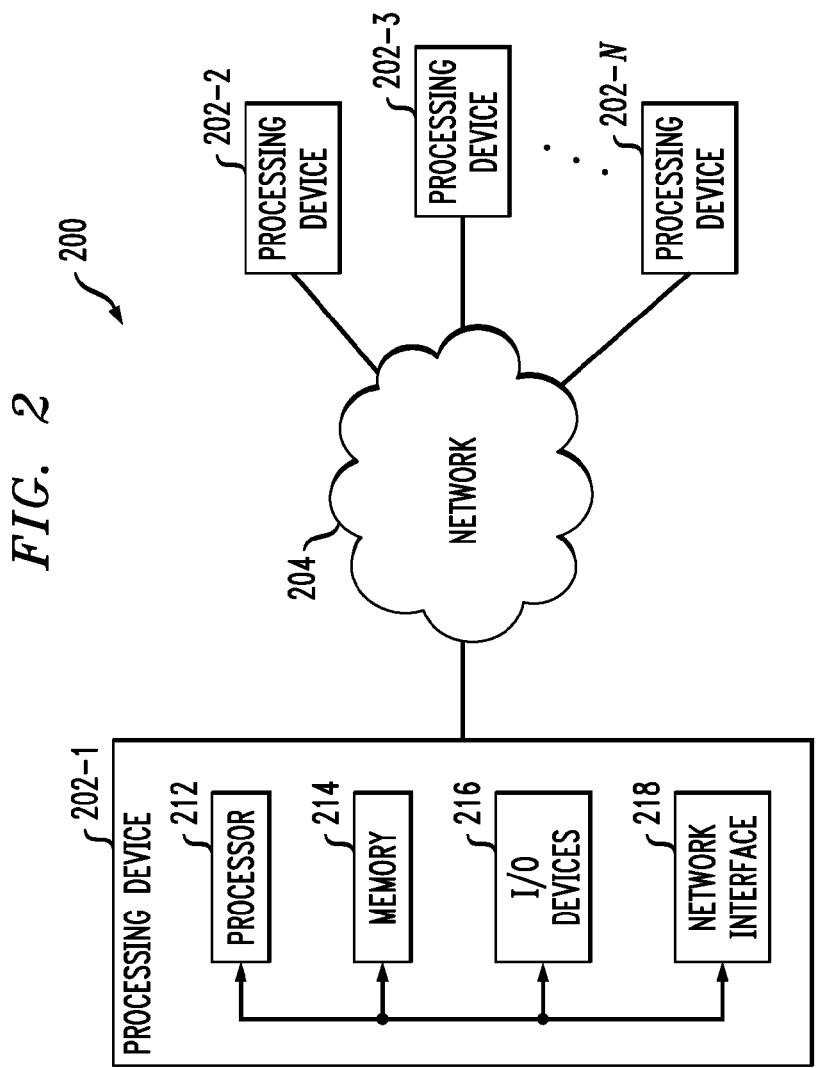
FIG. 2 shows a processing platform on which the distributed computing system and the migration management system of FIG. 1 are implemented, in accordance with one embodiment of the invention.

An example of a processing platform on which the system environment 100 of FIG. 1 may be implemented is information processing platform 200 shown in FIG. 2. The processing platform 200 in this embodiment comprises a plurality of processing devices, denoted 202-1, 202-2, 202-3, . . . 202-K, which communicate with one another over a network 204. The distributed computing system 110 and the migration management system 120 may each run on a server, computer or other processing platform element, which may be viewed as an example of what is more generally referred to herein as a "processing device." Note that one or more processing devices in FIG. 2 may be servers, while one or more processing devices may be client devices. As illustrated in FIG. 2, such a device generally comprises at least one processor and an associated memory, and implements one or more functional modules for controlling features of the system environment 100. Again, multiple elements or modules may be implemented by a single processing device in a given embodiment.

The processing device 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. Components of a computing system as disclosed herein can be implemented at least in part in the form of one or more software programs stored in memory and executed by a processor of a processing device such as processor 210. Memory 212 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 212 may comprise electronic memory such as random access memory (RAM), read-only memory (ROM) or other types of memory, in any combination. The one or more software programs when executed by a processing device such as the processing device 202-1 causes the device to perform functions associated with one or more of the elements/components of system environment 100. One skilled in the art would be readily able to implement such software given the teachings provided herein. Other examples of processor-readable storage media embodying embodiments of the invention may include, for example, optical or magnetic disks.

Processing device 202-1 also includes network interface circuitry 214, which is used to interface the device with the network 204 and other system components. Such circuitry may comprise conventional transceivers of a type well known in the art.

The other processing devices 202 of the processing platform 200 are assumed to be configured in a manner similar to that shown for computing device 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 200 may include additional or alternative processing platforms, as well as numerous distinct processing platforms in any combination.

Also, numerous other arrangements of servers, clients, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the processing platform 200 of FIG. 2 can comprise virtual machines (VMs) implemented using a hypervisor. A hypervisor is an example of what is more generally referred to herein as "virtualization infrastructure." The hypervisor runs on physical infrastructure. As such, the data analytics and management techniques illustratively described herein can be provided in accordance with one or more cloud services. The cloud services thus run on respective ones of the virtual machines under the control of the hypervisor. Processing platform 200 may also include multiple hypervisors, each running on its own physical infrastructure. Portions of that physical infrastructure might be virtualized. As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 200 in one or more embodiments of the invention is the VMware vSphere® (VMware Inc. of Palo Alto, Calif.) which may have an associated virtual infrastructure management system such as the VMware vCenter®. The underlying physical infrastructure may comprise one or more distributed processing platforms that include storage products such as VNX® and Symmetrix VMAX®, both commercially available from EMC Corporation of Hopkinton, Mass. A variety of other computing and storage products may be utilized to implement the one or more cloud services that provide the migration management functionality and features described herein.

As mentioned above, a common practice for existing migration is to manually manage the generation of the migration plan using spreadsheets and significant manpower. However, as pointed out, this manual practice is typically suboptimal and unable to fully consider the optimization accounting for all important constraints, and requires a full redesign in the event that the constraint or environment changes. This increases the turnaround time for generating plans, which in turn extends the period of migration causing inconvenience to the stakeholders.

A review of the constraints under consideration highlight the difficulty involved in re-working the plans.

Bundling constraints are constraints that influence the creation of the migration plans. They include, but are not limited to, constraints on dependency between servers. If dependency constraints are violated, this can lead to observable latency in services offered. Customer constraints are constraints in the form of which servers must or must not move together, which may vary. Partition constraints are constraints whereby servers belonging to a particular application are partitioned based on their environment.

Deployment constraints are constraints that influence the scheduling of the actual moves of the servers. For example, movement day constraints may specify that a server is associated with a particular day of the week (weekend or weekday) when it might be movable. Ordering constraints may be deployment constraints as well. For instance, an ordering constraint may specify that test servers of a particular application move before the production/development servers of that application.

In the manual approach, the bundling is done without considering the deployment constraints based solely on application dependencies that exist between servers.

Advantageously, illustrative embodiments of the invention jointly optimize over both the bundling and deployment constraints. The system is also robust to changes in constraints as the newer plans can be re-worked in lesser time compared to the manual approach.

Figure 3:
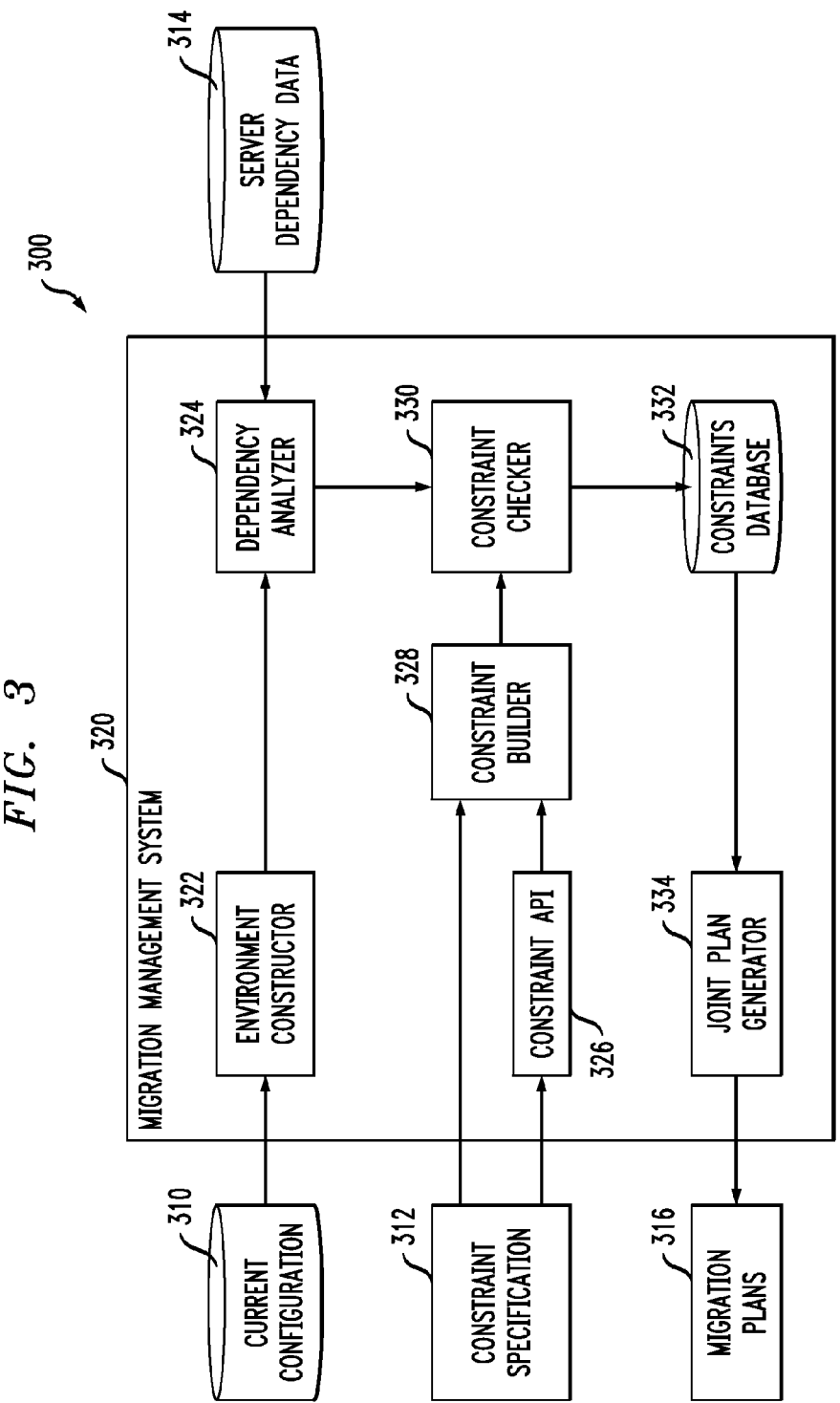
FIG. 3 shows details of a migration management system, in accordance with one embodiment of the invention.

We now describe illustrative embodiments of a system and methodology for migration management in the context of FIGS. 3-5.

It is realized here that server migration planning is a time consuming task with applications to data center migration, virtualization of servers, hardware migration etc. Server migrations involve identifying the set of servers that need to be migrated together while considering constraints such as day on which migration is possible, customer constraints, ordering constraints, etc. A significant challenge is generating migration schedules for the server migration while considering the resource availability on the day of the migration. Embodiments of the invention achieve the above efficiently while reducing the turnaround time for generating the plans in the face of changing constraints.

Thus, embodiments will now be described that address the following exemplary problem. It is to be understood that embodiments of the invention are not limited to this particular problem. The problem is to create a data center migration plan that satisfies both the server bundling constraints and deployment constraints. We assume availability of the current data center environment configuration data comprising the servers in the data center, application and server dependencies and constraints (if any) such as customer or application administrator/owner specified constraints, and time and day of move constraints. The new location for deployment may be within the same data center or one or more new data centers. It is to be appreciated that the distributed computing system 110 in FIG. 1 represents one or more data centers.

FIG. 3 shows details of a migration management system, in accordance with one embodiment of the invention. As shown in system environment 300, a migration management system 320 receives, as input, current configuration data 310, constraint specification data 312 and server dependency data 314. The migration management system 320 generates and outputs one or more migration plans 316 based on this input data, as will be described in greater detail below. The migration management system 320 includes an environment constructor 322, a dependency analyzer 324, a constraint application programming interface (API) 326, a constraint builder 328, a constraint checker 330, a constraints database 332 and a joint plan generator 334, operatively coupled as shown in FIG. 3.

The current configuration data 310 includes information regarding the servers in the data center, the applications hosted by the server, the network switches to which the servers are connected, etc. Server dependency data 314 includes data describing the relationships that exist between the servers.

The environment constructor 322 assimilates data from the different tables in the current configuration data 310 to create an in-memory representation. The dependency analyzer 324 builds a model of the dependencies (from the server dependency data 314) that exist in the current environment. This model is provided as input to the constraint checker 330.

Constraint specification data 312 describes constraints that are specified by administrators or owners of applications/servers. The constraint API 326 serves as a template for specification of the constraints. The constraint builder 328 invokes the constraint API 326 for initializing the constraints. The constraint builder 328 assists in isolating program logic from actual implementation of the constraints, thus enhancing the flexibility of specifying newer constraints. The constraint checker 330 checks for any conflicting constraints. Conflicting constraints are an oft occurring problem since constraints are consolidated from multiple stakeholders. The validated constraints are stored in a constraint database 332 which is queried by the joint plan generator 334 while generating the one or more migration plans 316. The joint plan generator 334 creates bundles of servers that satisfy the application and server dependency constraints (bundling constraints) and migration constraints. A multitude of plans are possible for a given set of constraints, however, this module selects the plan which has maximum adherence to the constraints and uses it to generate the final move plans for the servers, i.e., when the actual moves can be undertaken. The one or more migration plans 316 comprise one or more visual documents (e.g., graphs) which serve as explanatory aids for understanding the plans. Such plans can be generated by a plan visualizer that is part of the joint plan generator 334.

Thus, advantageously, the migration management system 320 generates migration plans by jointly optimizing over both the bundling as well as the move constraints. Constraints can be added and removed on the fly. Constraint templates help in easily specifying constraints. Constraint checking is done to ensure that all conflicting constraints are known at the beginning of the migration process. A plan visualizer depicts plans using graphs that are easily understandable.

FIGS. 4A through 4F show a server migration planning and scheduling example which considers bundling and deployment constraints, in accordance with one embodiment of the invention. FIG. 4A shows server information table 410 which lists server names, server environment (e.g., production, test, development), migration method (e.g., decommission, fork lift, P2V—physical to virtual, V2V—virtual to virtual), operating system (OS such as, e.g., Linux, Windows) and type of server (e.g., database). FIG. 4B shows application-server mapping table 420 which lists which applications reside on which servers, as well as the server environment. FIG. 4C shows server-server mapping table 430 which lists source and target servers. FIG. 4D shows link properties table 440 which lists link types and corresponding link strengths. FIG. 4E shows constraints table 450 which lists various constraints associated with each server such as permissible timing of a migration (weekday, weekend, business hours (Y—Yes or N—No)) and which servers must and must not move with specific server. FIG. 4F shows joint migration plan table 460 which illustrates the possible plans (P1, P2 and P3) taking into account the information in tables 410 through 450.

More particularly, the server information table 410 serves as input to the migration management system 320 and comprises server attributes which are in turn used for determining the constraints. The application-server mapping table 420 maps the application to the servers.

We do not assume a bijective mapping between applications and servers i.e., multiple applications can be hosted on a single server and vice versa. The dependencies between servers can be of varying strength depending on the server attributes. The link properties table 440 specifies the weights to the links. The constraints table 450 illustrates a few possible constraints that could likely be encountered. The joint migration plan table 460 illustrates three of the many possible migration scenarios for the given configuration. Plan 1 represents the most optimal bundling since the server R1 is bundled and migrated along with S1, S2 and S4 since S1 and S4 are database servers and, as per the link strengths, it is more profitable to move with this configuration.

The (customer) constraints table 450 is responsible for most changes to the bundling and migration move scheduling plans. A minor change in the constraints will lead to re-working the plans and the cost increases with increases in the number of servers or as the environment becomes more complex with more links between servers. There is also the problem of conflicting constraints such as S1 and S3 must move together but both of them belong to different environments. Such conflicts, in existing migration management systems, are usually discovered at a later stage in the planning, thus increasing the cost of generating plans. With embodiments of the invention, these conflicts are known at an earlier stage, thus decreasing such cost.

FIG. 5 shows a migration management methodology 500, in accordance with one embodiment of the invention. Such a methodology can be performed by the migration management system 320 of FIG. 3 (120 of FIG. 1). Step 502 obtains a first data set specifying configuration information associated with elements of a computing system (e.g., distributed computing system 110). Step 504 obtains a second data set specifying dependency information associated with the elements of the computing system. Step 506 obtains a third data set specifying deployment constraint information associated with the elements of the computing system. Step 508 automatically generates a plan for migrating one or more of the elements of the computing system based on at least a portion of the first data set, at least a portion of the second data set, and at least a portion of the third data set. The automatic generation of the migration plan checks for one or more conflicts between configuration information, dependency information and deployment constraint information, and generates the migration plan to at least substantially eliminate the one or more conflicts.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising:
obtaining, at a migration management system, a first data set specifying configuration information associated with elements of a computing system, a second data set specifying dependency information associated with the elements of the computing system, and a third data set specifying deployment constraint information associated with the elements of the computing system;

generating, at an environment constructor component of the migration management system, an in-memory representation of a current configuration of the elements of the computing system by assimilating data from a plurality of tables in the first data set, the plurality of tables comprising a first table specifying a plurality of servers in the current configuration of the elements of the computing system and at least a second table specifying applications hosted by respective ones of the plurality of servers in the current configuration of the elements of the computing system;

generating, at a dependency analyzer component of the migration management system, a dependency model for the current configuration of the elements of the computing system based on at least a portion of the first data set and at least a portion of the second data set, the second data set comprising dependencies between the plurality of servers in the current configuration of the elements of the computing system;

generating, at a constraint builder component of the migration management system, a set of constraints based on at least a portion of the third data set, wherein the set of constraints comprises one or more bundling constraints and one or more deployment constraints, the one or more bundling constraints specifying dependencies between at least one of one or more servers and one or more applications, the one or more deployment constraints specifying one or more temporal constraints associated with migrating specified ones of the servers and one or more ordering constraints associated with migrating specified ones of the servers;

wherein generating the set of constraints comprises invoking a constraint application programming interface to initialize the set of constraints, the third data set being obtained at least in part by specification of one or more of the set of constraints via the constraint application programming interface, and wherein the third data set is isolated from the first data set and the second data set such that the third data set is modifiable via the constraint application programming interface without affecting the first data set and the second data set;

generating a set of validated constraints, wherein generating the set of validated constraints comprises identifying, at a constraint checker component of the migration management system, one or more conflicting ones of the set of constraints utilizing the dependency model and the in-memory representation of the current configuration of the elements of the computing system;

automatically generating, by a joint plan generator of the migration management system, a migration plan for migrating one or more of the elements of the computing system based on the set of validated constraints, the migration plan comprising a schedule for migrating two or more different bundles of servers in the current configuration of the elements of the computing system at different times, each bundle comprising a set of the plurality of servers in the current configuration of the elements of the computing system that is identified based on the deployment constraints and the bundling constraints; and responsive to modifying the third data set via the constraint application programming interface, the joint plan generator is configured to automatically generate a modified migration plan;

wherein the method is performed by at least one processing device configured to implement the migration management system for automatically generating the migration plan such that at least a portion of the elements of the computing system are deployed in accordance with the generated migration plan.

2. The method of claim 1, wherein the first data set specifying configuration information associated with the elements of the computing system further comprises one or more of identifying information for the elements of the computing system, identifying information for computer programs executed by the elements of the computing system, and connectivity information for the elements of the computing system.

3. The method of claim 2, wherein the second data set specifying dependency information associated with the elements of the computing system further comprises information defining relationships between the elements of the computing system.

4. The method of claim 3, wherein generating the dependency model comprises:
analyzing at least a portion of the dependency information in view of at least a portion of the configuration information; and
building the dependency model representing dependencies that exist in the current configuration of the computing system.

5. The method of claim 1, wherein at least one of the temporal constraints and the ordering constraints are obtained from one of an administrator and an owner of the elements of the computing system.

6. The method of claim 1, wherein the automatic migration plan generating step further comprises grouping, for migration together, a subset of the elements of the computing system that satisfy a set of the bundling and deployment constraints into a given one of the bundles.

7. The method of claim 6, wherein the automatic migration plan generating step further comprises selecting, from a plurality of candidate migration plans, a migration plan that has maximum adherence to the bundling and deployment constraints.

8. The method of claim 7, wherein the automatic migration plan generating step further comprises generating a visual document which serves as an explanatory aid for understanding the selected migration plan.

9. The method of claim 1, wherein the servers comprise at least one of physical elements and virtual elements.

10. The method of claim 1, wherein the computing system comprises one or more distributed data centers.

11. The method of claim 1, wherein the computing system comprises at least one of a private cloud and a public cloud.

12. The method of claim 1, wherein the third data set is isolated from the first data set and the second data set such that a change in the validated constraints does not affect the dependency model generated from the first data set and the second data set.

13. The method of claim 1, further comprising storing the set of validated constraints at a constraint database of the migration management system, wherein the joint plan generator queries the constraint database during the generation of the migration plan.

14. An article of manufacture comprising a non-transitory processor-readable storage medium having encoded therein executable code of one or more software programs, wherein the one or more software programs when executed by at least one processing device implement steps of:

obtaining, at a migration management system, a first data set specifying configuration information associated with elements of a computing system, a second data set specifying dependency information associated with the elements of the computing system, and a third data set specifying deployment constraint information associated with the elements of the computing system generating, at an environment constructor component of the migration management system, an in-memory representation of a current configuration of the elements of the computing system by assimilating data from a plurality of tables in the first data set, the plurality of tables comprising a first table specifying a plurality of servers in the current configuration of the elements of the computing system and at least a second table specifying applications hosted by respective ones of the plurality of servers in the current configuration of the elements of the computing system generating, at a dependency analyzer component of the migration management system, a dependency model for the current configuration of the elements of the computing system based on at least a portion of the first data set and at least a portion of the second data set, the second data set comprising dependencies between the plurality of servers in the current configuration of the elements of the computing system generating, at a constraint builder component of the migration management system, a set of constraints based on at least a portion of the third data set, wherein the set of constraints comprises one or more bundling constraints and one or more deployment constraints, the one or more bundling constraints specifying dependencies between at least one of one or more servers and one or more applications, the one or more deployment constraints specifying one or more temporal constraints associated with migrating specified ones of the servers and one or more ordering constraints associated with migrating specified ones of the servers wherein generating the set of constraints comprises invoking a constraint application programming interface to initialize the set of constraints, the third data set being obtained at least in part by specification of one or more of the set of constraints via the constraint application programming interface, and wherein the third data set is isolated from the first data set and the second data set such that the third data set is modifiable via the constraint application programming interface without affecting the first data set and the second data set;

generating a set of validated constraints, wherein generating the set of validated constraints comprises identifying, at a constraint checker component of the migration management system, one or more conflicting ones of the set of constraints utilizing the dependency model and the in-memory representation of the current configuration of the elements of the computing system;

automatically generating, by a joint plan generator of the migration management system, a migration plan for migrating one or more of the elements of the computing system based on the set of validated constraints, the migration plan comprising a schedule for migrating two or more different bundles of servers in the current configuration of the elements of the computing system at different times, each bundle comprising a set of the plurality of servers in the current configuration of the elements of the computing system that is identified based on the deployment constraints and the bundling constraints; and responsive to modifying the third data set via the constraint application programming interface, the joint plan generator automatically generates a modified migration plan;

wherein the steps are performed by the at least one processing device configured to implement the migration management system for automatically generating the migration plan such that at least a portion of the elements of the computing system are deployed in accordance with the generated migration plan.

15. An apparatus comprising:

at least one memory; and at least one processor operatively coupled to the at least one memory and configured to:

obtain, at a migration management system, a first data set specifying configuration information associated with elements of a computing system, a second data set specifying dependency information associated with the elements of the computing system, and a third data set specifying deployment constraint information associated with the elements of the computing system;

generate, at an environment constructor component of the migration management system, an in-memory representation of a current configuration of the elements of the computing system by assimilating data from a plurality of tables in the first data set, the plurality of tables comprising a first table specifying a plurality of servers in the current configuration of the elements of the computing system and at least a second table specifying applications hosted by respective ones of the plurality of servers in the current configuration of the elements of the computing system;

generate, at a dependency analyzer component of the migration management system, a dependency model for the current configuration of the elements of the computing system based on at least a portion of the first data set and at least a portion of the second data set, the second data set comprising dependencies between the plurality of servers in the current configuration of the elements of the computing system;

generate, at a constraint builder component of the migration management system, a set of constraints based on at least a portion of the third data set, wherein the set of constraints comprises one or more bundling constraints and one or more deployment constraints, the one or more bundling constraints specifying dependencies between at least one of one or more servers and one or more applications, the one or more deployment constraints specifying one or more temporal constraints associated with migrating specified ones of the servers and one or more ordering constraints associated with migrating specified ones of the servers;

wherein generating the set of constraints comprises invoking a constraint application programming interface to initialize the set of constraints, the third data set being obtained at least in part by specification of one or more of the set of constraints via the constraint application programming interface, and wherein the third data set is isolated from the first data set and the second data set such that the third data set is modifiable via the constraint application programming interface without affecting the first data set and the second data set;

generate a set of validated constraints, wherein the generation of the set of validated constraints comprises an identification of, at a constraint checker component of the migration management system, one or more conflicting ones of the set of constraints utilizing the dependency model and the in-memory representation of the current configuration of the elements of the computing system;

automatically generate, by a joint plan generator of the migration management system, a migration plan for migrating one or more of the elements of the computing system based on the set of validated constraints, the migration plan comprising a schedule for migrating two or more different bundles of servers in the current configuration of the elements of the computing system at different times, each bundle comprising a set of the plurality of servers in the current configuration of the elements of the computing system that is identified based on the deployment constraints and the bundling constraints; and responsive to modifying the third data set via the constraint application programming interface, the joint plan generator is configured to automatically generate a modified migration plan;

wherein the at least one processor is further configured to implement a migration management system for automatically generating the migration plan such that at least a portion of the elements of the computing system are deployed in accordance with the generated migration plan.

16. The apparatus of claim 15, wherein the first data set specifying configuration information associated with the elements of the computing system further comprises one or more of identifying information for the elements of the computing system, identifying information for computer programs executed by the elements of the computing system, and connectivity information for the elements of the computing system, and the second data set specifying dependency information associated with the elements of the computing system further comprises information defining relationships between the elements of the computing system.

17. The apparatus of claim 15, wherein the generation of the dependency model comprises an analysis of at least a portion of the dependency information in view of at least a portion of the configuration information, and a building of the dependency model representing dependencies that exist in the current configuration of the computing system.

18. The apparatus of claim 15, wherein the automatic migration plan generation further comprises a grouping of, for migration together, a subset of the elements of the computing system that satisfy dependency and deployment constraints into a given one of the bundles, and a selection of, from a plurality of candidate migration plans, a migration plan that has maximum adherence to the bundling and deployment constraints.

19. The apparatus of claim 15, wherein the processor is further configured to store the set of validated constraints at a constraint database of the migration management system, and wherein the joint plan generator queries the constraint database during the generation of the migration plan.

* * * * *